United States Patent [19]

Zinger

[11] Patent Number: 5,301,139
[45] Date of Patent: Apr. 5, 1994

[54] SHIFTER CIRCUIT FOR MULTIPLE PRECISION DIVISION

[75] Inventor: Ron Zinger, Sunnyvale, Calif.

[73] Assignee: Intel Corporation, Santa Clara, Calif.

[21] Appl. No.: 938,871

[22] Filed: Aug. 31, 1992

[51] Int. Cl.⁵ .............................................. G06F 7/52
[52] U.S. Cl. .................................... 364/767; 364/766; 364/745
[58] Field of Search ..................... 364/767, 745, 766

[56] References Cited

U.S. PATENT DOCUMENTS

| | | | |
|---|---|---|---|
| 4,272,827 | 6/1981 | Inui et al. | 364/745 |
| 4,939,686 | 7/1990 | Fandrianto | 364/767 |
| 4,979,142 | 12/1990 | Allen et al. | 364/767 |
| 5,128,891 | 7/1992 | Lynch et al. | 364/767 |

Primary Examiner—David H. Malzahn
Attorney, Agent, or Firm—Blakely, Sokoloff, Taylor & Zafman

[57] ABSTRACT

A single, double and extended precision shifter circuit for a hardware floating point divide circuit is disclosed. The divide circuit implements the divide function by receiving two floating point numbers (X and Y) from a main processor, generating the quotient of X/Y using radix 4 SRT nonrestoring division steps, and then delivering the quotient to the main processor. The divide circuit is comprised of a control circuit, a quotient prediction circuit, a partial remainder generator circuit and a quotient generator circuit. The precision shifter circuit operates during the nonrestoring division steps to steer the next negative and positive quotient values generated by the quotient prediction circuit into the proper place within respective negative and positive quotient registers of the quotient generation circuit. The steering is performed according to the precision specified for the divide operation.

29 Claims, 6 Drawing Sheets

SHIFTER CIRCUIT FOR MULTIPLE PRECISION DIVISION

BACKGROUND OF THE INVENTION

1. Field of the Invention

This invention relates to the field of digital information processing systems. More particularly, this invention relates to microarchitecture hardware implementation in connection with certain mathematical algorithms for improving the computing capacity of such systems.

2. Art Background

A common method of improving speed of a computer system is to employ a math processor, separate from the main processor, for performing mathematical calculations. The combination main processor and math processor provides greatly increased speed of system operation, since math processors are optimized for performing mathematical calculations, and since the burden of performing specialized calculations is lifted from the main processor. Tasks typically delegated to a math processor include addition, subtraction, multiplication and division. To save critical space within the math processor, many component circuits of the math processor are designed to perform several functions. For example, it is quite common for the same component circuits to be used when performing multiplication, division and square root functions.

Each new generation of computer system design requires increasingly sophisticated computers to perform calculations faster than previous generations of computers and to perform the calculations with increasingly greater precision. Previous math processors used single digit, or 1 bit of quotient per clock (radix 2), nonrestoring division steps to generate the division function. However, this method is time-consuming since the number of division steps required increases approximately proportionally to the precision required for the division operation. The large number of steps required by single digit nonrestoring division, particularly for IEEE floating point extended precision, greatly slows the division function.

Furthermore, in slower divider circuits, or in divider circuits which do not have a wide data path width required by extended precision, when a lesser precision result is required than the maximum precision of the divider, it is common to permit the significant bits of the quotient to accumulate in a format such that the most significant bits (MSBs) of the quotient occupy the least significant bits (LSBs) which are output from the divider. A steering multiplexer (MUX) is then placed between the divider circuit and the result bus and is used to steer the significant bits to their proper position on the bus (i.e. so that the significant bits of the quotient occupy the most significant bits of the result bus regardless of the precision specified for the division operation). Generally, no shifting is required by the steering MUX for the maximum precision case, because a maximum result has the same number of significant bits as the width of the result bus.

However, in the worst case, (i.e. a single precision divide with an extended precision result bus), the significant bits of the resulting quotient would have to be shifted to a higher order by 40 bit positions and the least significant 40 bits filled with zeros. The use of a steering MUX following the divider circuit is not practical in a fast, extended precision processor for several reasons. First, the paths necessary to perform a 40 bit position shift for a single precision result, and a 12 bit position shift for an extended precision result, would occupy an unacceptably large amount of critical area upon the circuit board. Also, the length and number of the traces to perform the shifts would place a large capacitive load upon the final stage of the divider circuit.

Furthermore, if a steering MUX were used between the final stage of the divider circuit and the result bus, additional logic would be required there to implement the MUX. The increased logic would increase the load which the final stage must drive, thereby requiring that a larger driver be used in the final stage. A larger driver in the final stage would increase the area of the final stage, as well as its power consumption. Additionally, the increased amount of logic in the steering MUX would occupy additional precious board area and would introduce additional propagation delay. The latter is significant since the steering MUX would lie upon the critical path of the divider if it were coupled between the output of the final stage and the result bus.

As will be disclosed, the present invention provides a method and apparatus for improving the speed of the division function by implementing non critical path significant bit position correction steering logic thereby decreasing the time spent by the division circuitry to generate a quotient with a selected single, double or extended precision.

SUMMARY OF THE INVENTION

A single, double and extended precision shifter circuit for a hardware floating point divide circuit is disclosed. The divide circuit implements the divide function by receiving two floating point numbers (X and Y) from a main processor, generating the quotient of X/Y using radix M (where M is a positive integer) SRT nonrestoring division steps, and then delivering the quotient to the main processor. The divide circuit is comprised of a control circuit, a quotient prediction circuit, a partial remainder generator circuit and a quotient generator circuit. The precision shifter circuit operates during the nonrestoring division steps to steer the next negative and positive quotient values generated by the quotient prediction circuit into the proper place within respective negative and positive quotient registers of the quotient generation circuit.

The control circuit first determines an iteration count (IC) for radix 4 SRT nonrestoring division based upon the required precision of the resulting quotient. The control circuit then generates control signals that control data flow through the quotient prediction circuit, the partial remainder generator circuit and the quotient generator circuit, in order to perform the divide function.

To perform the divide function, the floating point divide circuit begins by generating quotient bits using radix 4 SRT nonrestoring division. For each iteration of radix 4 SRT division, the quotient prediction circuit generates a 2 bit next negative and a 2 bit next positive quotient value, which is transmitted to the quotient generator circuit.

The steering logic of the quotient generator circuit steers the next negative and positive quotient values generated by the quotient prediction circuit into the proper place within respective negative and positive quotient registers of the quotient generation circuit.

After completing the radix 4 SRT nonrestoring division steps, the quotient generator circuit then converts the final quotient into nonredundant form.

DETAILED DESCRIPTION OF THE INVENTION

A hardware division circuit is disclosed which implements a floating point division function by receiving two floating point numbers from a main processor, generates the resulting quotient using radix 4 SRT nonrestoring division steps and steers the next quotient bits generated in each step to a location dependent upon the desired precision of the result. In the following description, for purposes of explanation, specific circuit devices, circuit architectures, and components are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

Figure 1:
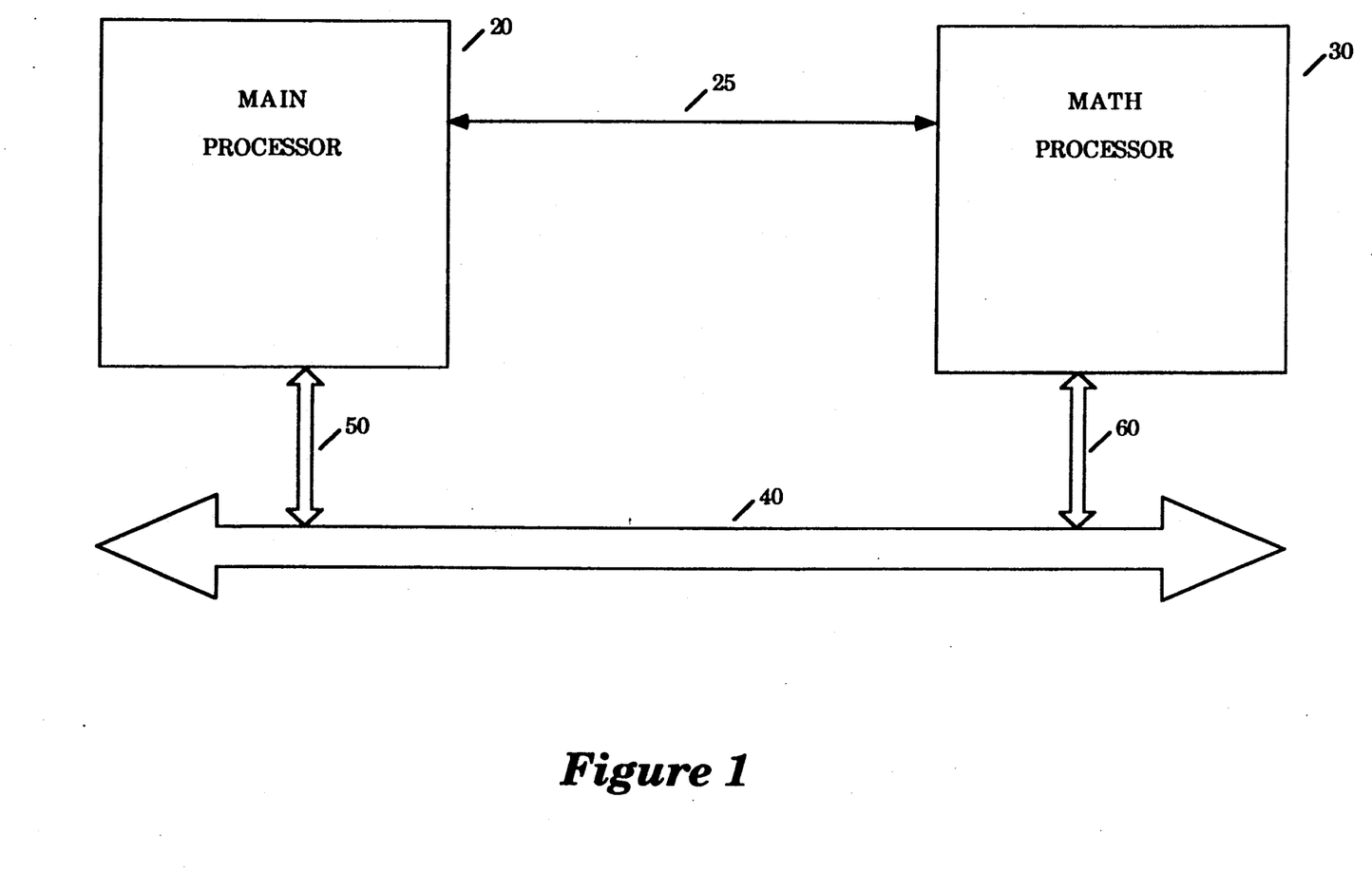
FIG. 1 is a block diagram of a computer system employing the teachings of the present invention, which illustrates communication between a main processor and a math processor.

Referring now to FIG. 1, a computer system employing the teachings of the present invention is illustrated. A main processor 20 and a math co-processor 30 are coupled to transfer information over a common bus 40. In this arrangement, the main processor 20 transfers math instructions and arguments to the math co-processor 30 over the bus 40. The results of math operations are transferred from the math processor 30 to the main processor 20, also over the common bus 40. Control bus 25 provides for synchronization and control of communication between math co-processor 30 and main processor 20.

To perform the divide function, math processor 30 receives the divide instruction and arguments from main processor 20 over bus 60. The arguments for the divide instruction include two floating point numbers, dividend X and divisor Y. A wide variety of inter-processor communication structures may be used for transferring instructions, arguments, and results between a main processor 20 and a math processor 30. Possible inter-processor communication structures include stacks and data cues, which may be located internal to the main processor 20 and the math processor 30, or located in an external memory.

In floating point representation, a computer word defining a number is divided into three fields, a sign field, an exponent field, and a mantissa field. The sign field determines whether the number is positive or negative, the exponent field determines the magnitude of the number, and the mantissa field determines the fractional part of the number. In other words, if e is the value of the exponent field and f is the value of the fractional field, then the number being represented is $1.f \times 2^{e\text{-}bias}$, where bias is a fixed bias value added to ensure that the exponent field is never negative. The mantissa field represents the value 1.f.

The number of bits in the computer word allocated to the exponent and mantissa fields depends on the particular floating point standard being used. The IEEE floating point standard specifies single, double and extended precisions. For a description of the IEEE floating point standard, see *IEEE Standard for Binary Floating-point Arithmetic*, SIGPLAN Notices 22:2, 9–25 (p. A-61). The current embodiment of the divide circuit of the present invention supports single, double, and extended precision. However, it will be appreciated by one skilled in the art that the teachings of the present invention are readily extensible to floating point standards other than the IEEE standard.

Figure 2:
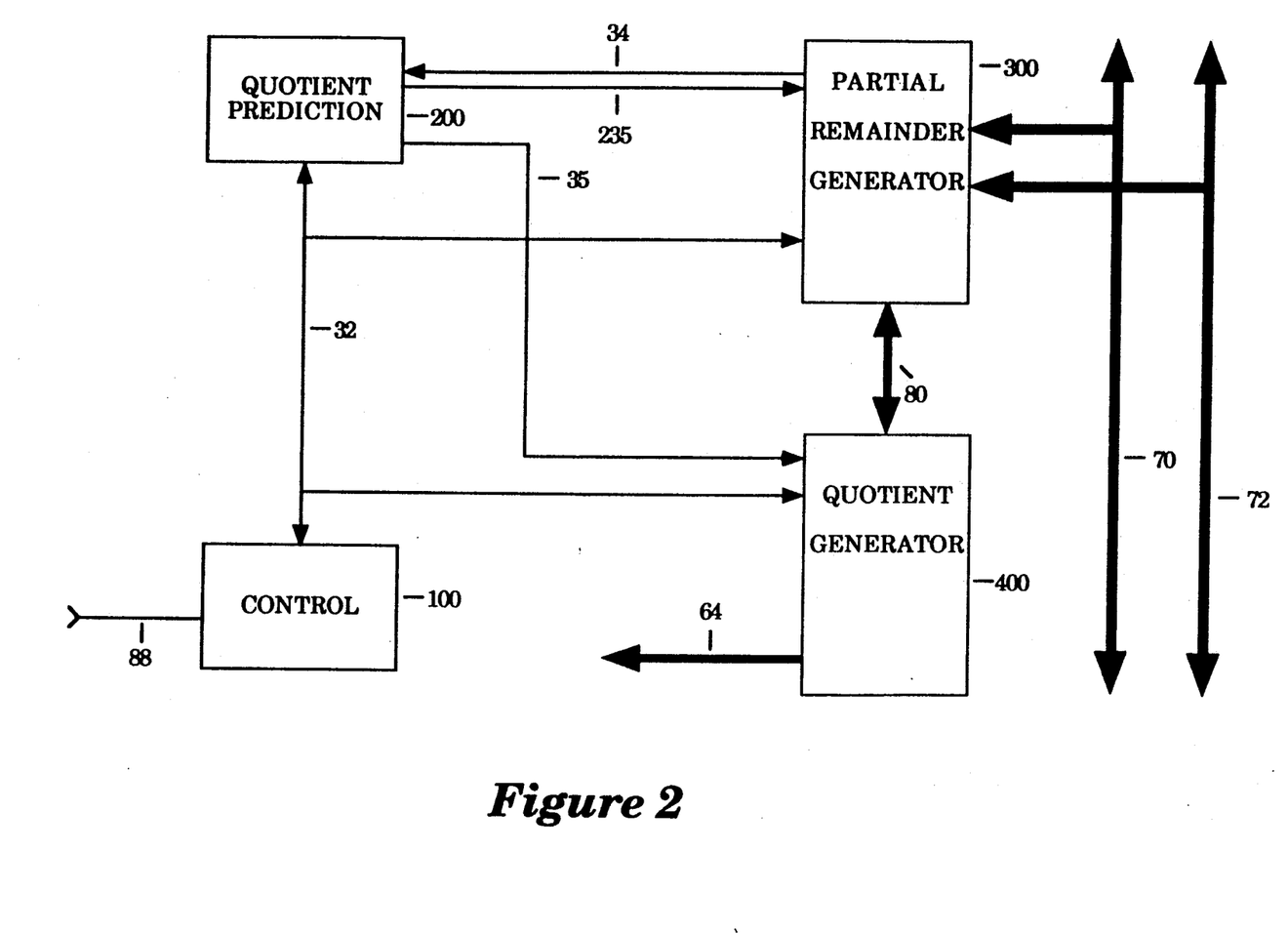
FIG. 2 is a block diagram of the division function circuitry of the present invention, which is contained within the math processor.

FIG. 2 provides a functional block diagram of one embodiment of the floating point divide circuit of the present invention. The divide circuit is comprised of a control circuit 100, a quotient prediction circuit 200, a partial remainder generator circuit 300 and a quotient generator circuit 400.

The control circuit 100 receives control signals 88 which indicate that the divide function is being executed by math processor 30, as well as the precision desired for the resulting quotient. Control circuit 100 determines an iteration count (IC) for radix 4 SRT (Sweeney, Robertson and Tocher) nonrestoring division and then generates control signals 32 in order to control the flow of data, through the quotient prediction circuit 200, the partial remainder generator circuit 300 and the quotient generator circuit 400, while performing the divide function. A wide variety of state machine designs which are well known in the art may be used to implement the function of control circuit 100, without departing from the spirit of the present invention.

To generate the divide function, the floating point divide circuit of one embodiment of the present invention generates IC pairs of quotient bits using radix 4 SRT nonrestoring division. However, it will be appreciated by one skilled in the art that the teachings of the present invention are not limited by radix 4 SRT nonrestoring division and are readily extensible to other division algorithms.

The basic SRT division algorithm involves generating solutions to the following recursive relationship (see Fandrianto, *Algorithm for High-Speed Shared Radix 4 Division and Radix 4 Square Root* (IEEE Publ. No. CH2419-0/87/0000/0073, 1987), and Hennessy and Patterson, *Computer Architecture-A Quantitative Approach* (1990)).

$$P_{j+1} = (R \times P_j) - (Q_{j+1} \times D) \qquad [\text{Eq.1}]$$

with the a range restriction given by;

$$|P_{j+1}| <= N \times D/(R-1)$$

where
$P_{j+1}$ = partial remainder in the j-th iteration
R = radix
$Q_j$ = quotient digit predicted in the j-th cycle
D = divisor
N = number of divisor multiples; i.e. (−2, −1, 0, 1, 2) for N=2.

Before discussing the hardware implementation of the precision dependent significant bit position correction steering logic of the present invention, a detailed description of the divide circuitry hardware is desirable.

Referring again to FIG. 2, partial remainder generator circuit 300 receives the dividend floating point number X over signal lines 70, and receives the divisor floating point number Y over signal lines 72. Partial remainder generator circuit 300 iteratively generates a partial remainder $P_{j+1}$ for SRT radix 4 nonrestoring division.

Quotient prediction circuit 200 predicts a next quotient value $(Q_{j+1})$ for SRT radix 4 nonrestoring division. Quotient prediction circuit 200 receives information from partial remainder generator circuit 300 over signals lines 34. The next quotient is transmitted to partial remainder generator circuit 300 over signal lines 235, and transmitted in redundant form to quotient generator circuit 400 over signal lines 35.

As stated above, partial remainder generator circuit 300, iteratively generates partial remainder $P_{j+1}$. The partial remainder is equal to next quotient 235 (received from quotient prediction circuit 200) times the mantissa of divisor 72. This is equivalent to the term $(Q_{j+1} \times D)$ of Eq. 1. This multiplier circuit was implemented to meet the exigencies of integrated circuit topology and speed requirements. However, a wide variety of multiplier or shifting circuits well known in the art may be employed to achieve the desired result within the framework of the present invention.

Quotient generator circuit 400 generates the final quotient in nonredundant form for delivery to main processor 20 over signal lines 64. Quotient generator circuit 400 is needed since the quotient is generated in redundant form by quotient prediction circuit 200.

In the current embodiment of the present invention, the mantissa fields of floating point numbers X and Y received from main processor 20 are 64 bits wide in order to accommodate extended precision. However, the working precision of the current embodiment is 68 bits. Three of the extra bits are used for rounding, and one of the extra bits is used for overflow. The data path is 70 bits wide to allow for a sign bit in the larger negative forms of the term $R*P_j$.

Figure 3:
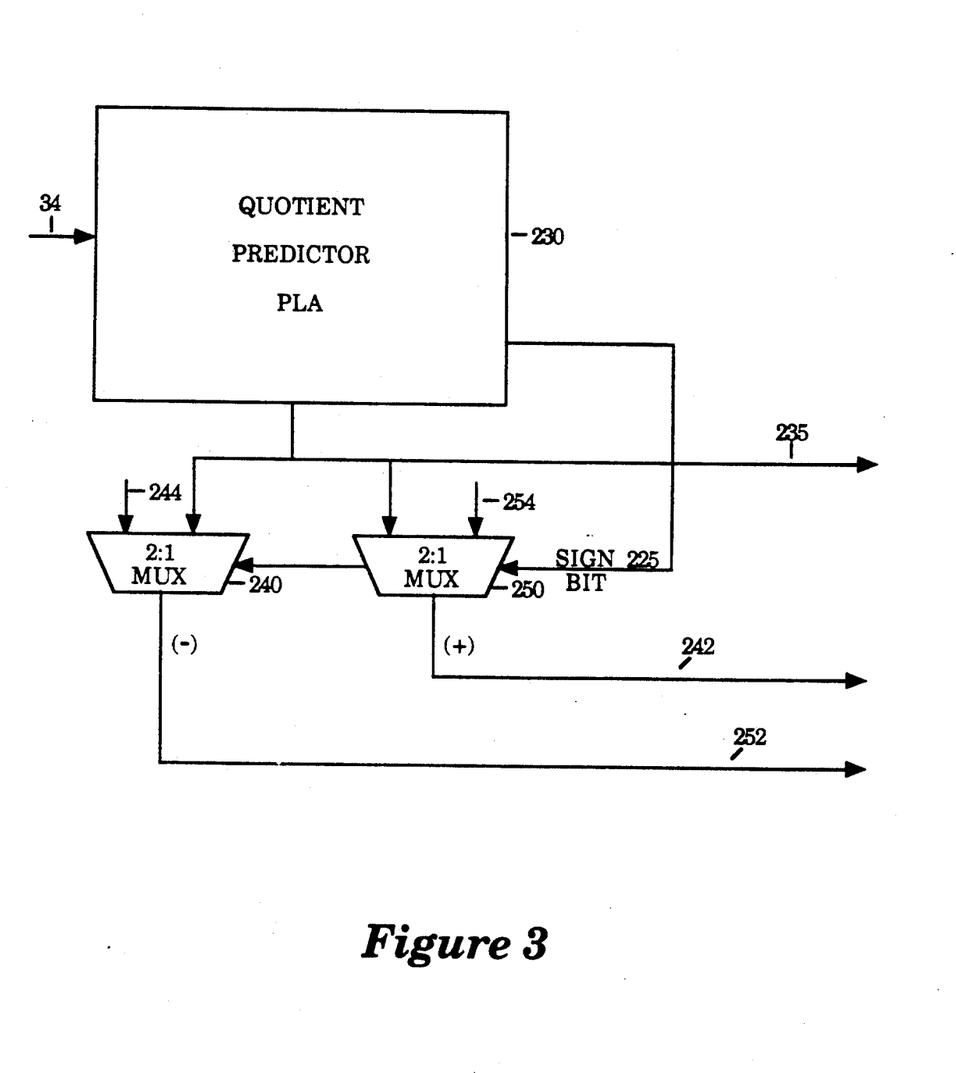
FIG. 3 is an illustration of the quotient prediction circuit, including the quotient predictor PLA, which is used to predict next positive and negative quotients for radix 4 SRT nonrestoring division.

FIG. 3 provides a schematic illustration of quotient prediction circuit 200. Quotient predictor programmable logic array (PLA) 230 receives the dividend, divisor and partial remainder $P_{j+1}$ over signal lines 34. PLA 230 generates next quotient 235 and next quotient sign bit 225.

Next quotient 235 is used for the radix 4 SRT divide sequence implemented by partial remainder generator circuit 300. Next quotient sign bit 225 is used to selectively couple next quotient 235 to next positive quotient 242 and next negative quotient 252. Inputs 244 and 254 of multiplexers 240 and 250 each provide a constant zero input of 2 bits. Thus, it will be appreciated that if next quotient 235 is positive, next quotient sign 255 causes multiplexer 250 to couple next quotient 235 to next positive quotient 242, and causes multiplexer 240 to couple constant zero 244 to next negative quotient 252. On the other hand, if next quotient 235 is negative, next quotient sign 225 causes multiplexer 240 to couple next quotient 235 to next negative quotient 252, and causes multiplexer 250 to couple constant zero 254 to next positive quotient 242. As will be described, next positive and next negative quotients 242 and 252 are used by quotient generator circuit 400 to generate a running quotient.

Quotient predictor PLA 230 generates next quotient values in the range of [−2, −1, 0, 1, 2]. For more complete discussion of quotient predictor PLA 230 and associated circuitry, refer to related application Ser. No. 07/938,003, filed Aug. 31, 1992, entitled Methods and Apparatus for Overriding Quotient Prediction in Floating Point Divider Information Processing Systems, and which is hereby incorporated fully by reference.

Figure 4:
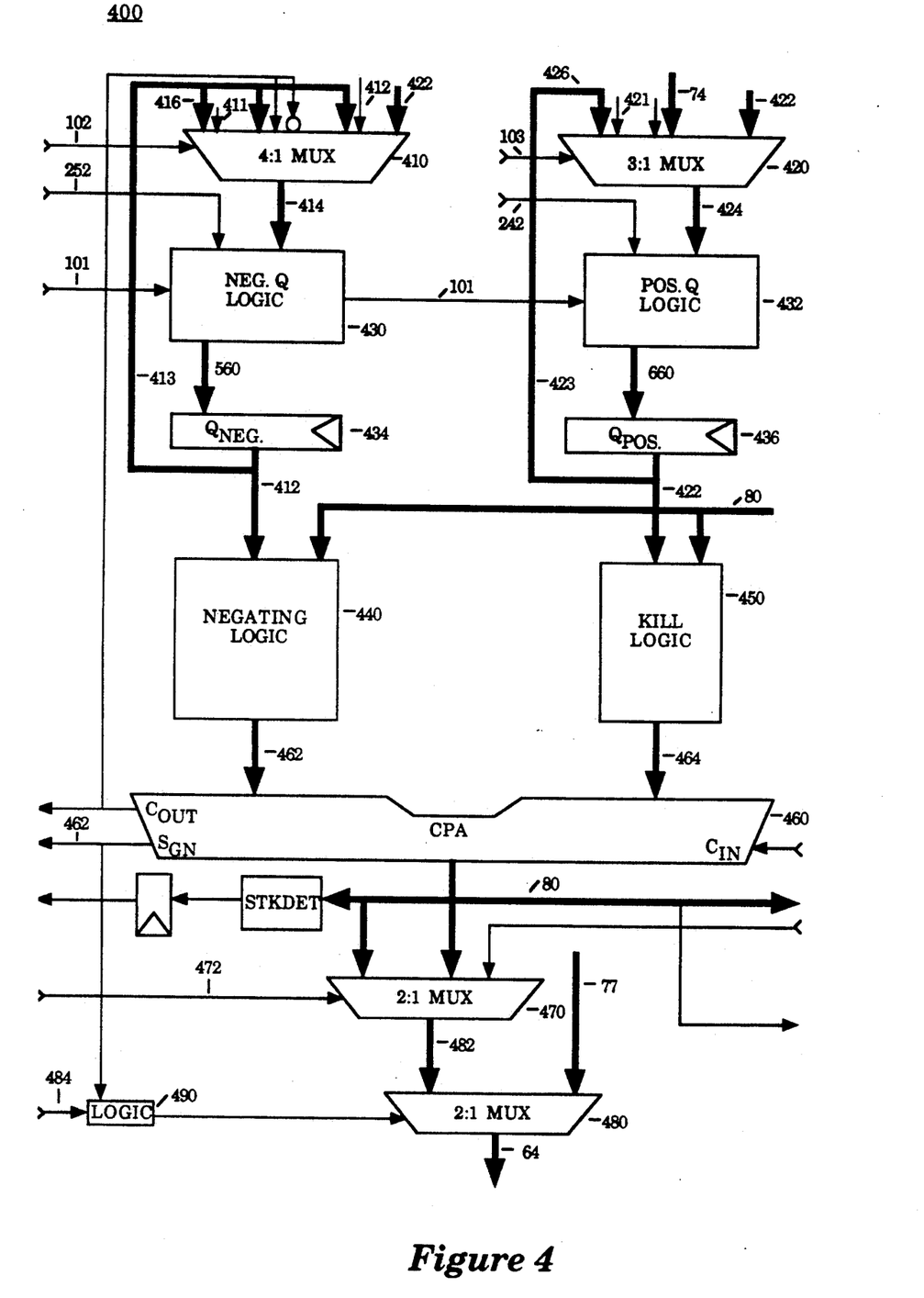
FIG. 4 is a schematic illustration of the quotient generator circuit, which is used to generate and combine the redundant forms of the quotient.

FIG. 4 is a schematic illustration of quotient generator circuit 400, which stores a running quotient in redundant form comprising a negative portion in register 434, and a positive portion in register 436. Carry propagate adder (CPA) 460 adds negative quotient 434 and positive quotient 436, which are coupled through negating logic 440 and kill logic 450, respectively, to generate a final quotient. For more complete discussion of negating logic 440 and kill logic 450 and related circuitry, refer to related application Ser. No. 07/938,286, filed Aug. 31, 1992, entitled Methods and Apparatus for Improved Quotient Correction in Nonrestoring Division Computation Circuits, and which is hereby incorporated fully by reference.

The quotient is output from CPA 460 onto intermediate result bus 80 which is coupled to precision override selector 470. Selector 470 is coupled by bus 482 to final result selector 480 which is controlled by logic 490 and releases the calculated nonredundant quotient result onto output bus 64.

In slower divider circuits, or in divider circuits which do not have a wide data path width required by extended precision, when a lesser precision result is required than the maximum precision of the divider, it is common to permit the significant bits of the quotient to accumulate in a format such that the most significant bits (MSBs) of the quotient occupy the least significant bits (LSBs) which are output from the divider (i.e. output from CPA 460 onto intermediate result bus 80). A steering MUX is then placed between CPA 460 and bus 80 and is used to steer the significant bits to their proper position on the bus 80 (i.e. so that the significant bits of the quotient occupy the most significant bits of bus 80 regardless of the precision specified for the division operation). In the current embodiment, no shifting would be required by the steering MUX for the extended precision case, because an extended precision number has the same number of significant bits as the width of the bus 80.

However, in the worst case of a current embodiment, (i.e. a single precision divide with an extended precision bus 80), the significant bits of the resulting quotient would have to be shifted to a higher order by 40 bit positions and the least significant 40 bits filled with zeros. The use of a steering MUX following CPA 460 is not practical in the current embodiment of the present invention for several reasons. First, the paths necessary to perform a 40 bit position shift for a single precision result, and a 12 bit position shift for an extended precision result, would occupy an unacceptably large amount of critical area upon the circuit board. Also, the length and number of the traces to perform the shifts would place a large capacitive load upon CPA 460.

Furthermore, if a steering MUX were used between CPA 480 and bus 80, additional logic would be required to implement the MUX. The additional logic of the steering MUX would increase the load upon CPA 460. The increased load would have to be driven by CPA 460 thereby requiring a larger driver be used in CPA 460. A larger driver in CPA 460 would increase the area of CPA 460 as well as its power consumption. Additionally, the increased amount of logic in the steering MUX would occupy additional precious board area and would introduce additional propagation delay. The latter is significant since the critical path in quotient generator 400 runs from register 434 through negating logic 440 and from register 436 through kill logic 450 into CPA 460. The critical path continues across intermediate result bus 80, through precision override selector 470, and onto bus 482. Then, the critical path goes through final result selector 480 (which is controlled by logic 490) and onto output bus 64. Therefore, if the steering MUX were coupled to the output of CPA 460, it would lie upon, and increase the length of, the critical path.

The present invention removes the steering MUX from the critical path. Instead of shifting results at the end of the calculations, they are shifted by negative quotient logic block 430 and positive quotient logic block 432 during each iteration of the iterative SRT division steps.

Negative quotient logic 430, in combination with multiplexer 410, merges next quotient 252 into the appropriate bits of negative quotient 434. Multiplexer 410 has 70 bit inputs and 70 bit outputs. Constant input 411 provides two bits of constant zero. Input 416 provides the lower 68 bits of negative quotient 434. Inputs 416 and 411, concatenated as the first input to multiplexer 410, are equivalent to negative quotient 434 shifted left (i.e. to a higher order) by two bits. The first input of multiplexer 410 is selectively coupled to input 414 of negative quotient logic 430 according to control signals 102 received from control circuit 100. Negative quotient logic 430 also receives precision select signal 101 from control circuit 100. Based upon precision select 101, negative quotient logic 430 merges next negative quotient 252 into negative quotient 434. If precision select 101 indicates single precision, negative quotient logic 430 merges next negative quotient 252 into bits 40 and 41 of negative quotient 434. If precision select 101 indicates double precision, negative quotient logic 430 merges next negative quotient 252 into bits 12 and 13 of negative quotient 434, and if precision select 101 indicates extended precision, negative quotient logic 430 merges next negative quotient 252 into bits 0 and 1 of negative quotient 434.

In a similar manner, positive quotient logic 432 and multiplexer 420 merge next quotient 242 into the appropriate bits of positive quotient 436. Multiplexer 420 has 70 bit inputs and 70 bit outputs. Constant input 421 provides two bits of constant zero, which are concatenated to the lower 68 bits of positive quotient 436 to form the first input of multiplexer 420. The first input of multiplexer 420 is selectively coupled to input 424 of positive quotient logic 432 according to control signals 103 received from control circuit 100. Positive quotient logic 432 merges next positive quotient 242 into positive quotient 436 according to precision select 101 received from control circuit 100. If precision select 101 indicates single precision, positive quotient logic 432 merges next positive quotient 242 into bits 40 and 41 of positive quotient 436. If precision select indicates double precision, positive quotient logic 432 merges next positive quotient 242 into bits 12 and 13 of positive quotient 436, and if precision select indicates extended precision, positive quotient logic 432 merges next positive quotient 242 into bits 0 and 1 of positive quotient 436.

Figure 5:
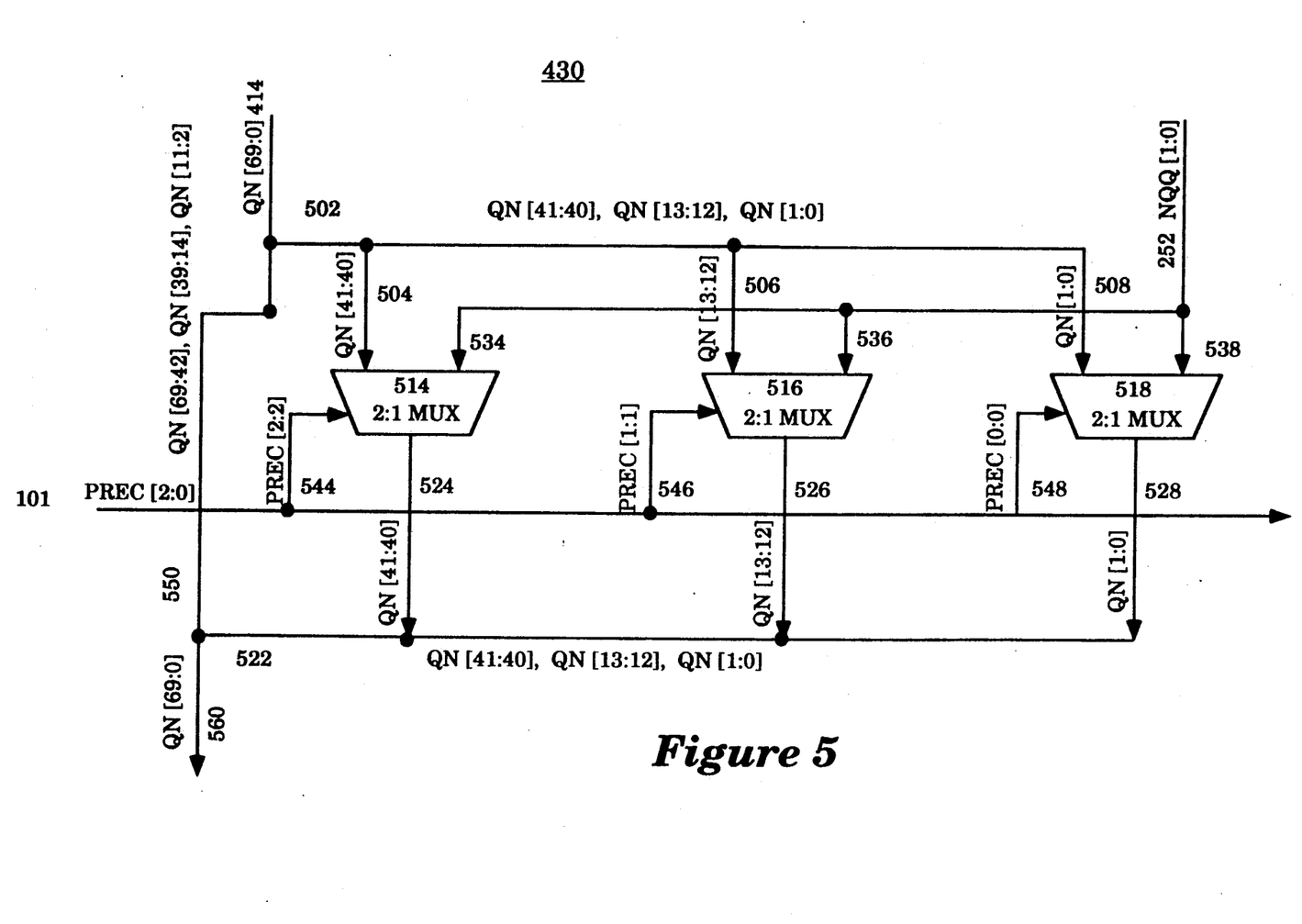
FIG. 5 is a schematic illustration of the steering logic which is used to steer the negative quotient prediction bits according to the precision selected.

FIG. 5 is a schematic illustration of negative quotient logic 430 which is used to steer the next negative quotient 252 prediction bits according to the precision indicated by precision select signal 101.

Precision select signal 101 is a three bit signal PREC[2:0]. If PREC[2:2] is asserted, single precision is required for the division operation. Similarly, if PREC[1:1] is asserted, double precision is required for the division operation, and if PREC[0:0] is asserted, extended precision is required for the division operation. PREC[2:0] is generated by control 100, which is a state machine, thereby guaranteeing that only one of the three bits will be asserted during a given division operation.

Next negative quotient 252 is a two bit signal NQQ[1:0]. It corresponds to the next two bits generated by the radix 4 SRT division algorithm quotient prediction logic 200 (FIG. 3).

During a division step, input 414 contains signal QN[69:0] which corresponds to the negative quotient from the previous step shifted left two bits with zeros added to the two right-most bits QN[1:0]. Similarly, output 560 contains signal QN[69:0] after the signal NQQ[1:0] has been shifted into the proper bits of signal QN[69:0] as indicated by PREC[2:0]. If PREC[2:2] is asserted, single precision is required for the division operation, and NQQ[1:0] is shifted into QN[41:40]. Similarly, if PREC[1:1] is asserted, double precision is required for the division operation, and NQQ[1:0] is shifted into QN[13:12]. Finally, if PREC[0:0] is asserted, extended precision is required for the division operation and NQQ[1:0] is shifted into QN[1:0]. This shifting function is accomplished by 2:1 multiplexers 534, 536 and 538, respectively. Note that if none of the PREC[2:0] signals are asserted, no shifting of NQQ[1:0] into QN[69:0] is performed and QN[69:0] is not altered. This permits the negative quotient logic 430 to be effectively idled.

The information contained in input 414 is split into multi-bit lines 502 and 550 with 502 containing QN[41:40], QN[13:12], QN[1:0] and 550 containing QN[69:42], QN[39:14], QN[11:2]. The information contained in line 502 is split into two-bit input lines 504, 506 and 508 with 504 containing QN[41:40], 506 containing QN[13:12] and 508 containing QN[1:0]. Input lines 504, 506 and 508 provide a first input to 2:1 multiplexers 514, 516 and 518, respectively. NQQ[0:1] provides the second input to multiplexers 514, 516 and 518.

Output lines 524, 526 and 528 contain the information for new QN[41:40], QN[13:12], QN[1:0] as determined by the values of PREC[2:0]. Lines 524, 526 and 528 merge to form line 522 which is then merged with line 550 to form line 560.

Figure 6:
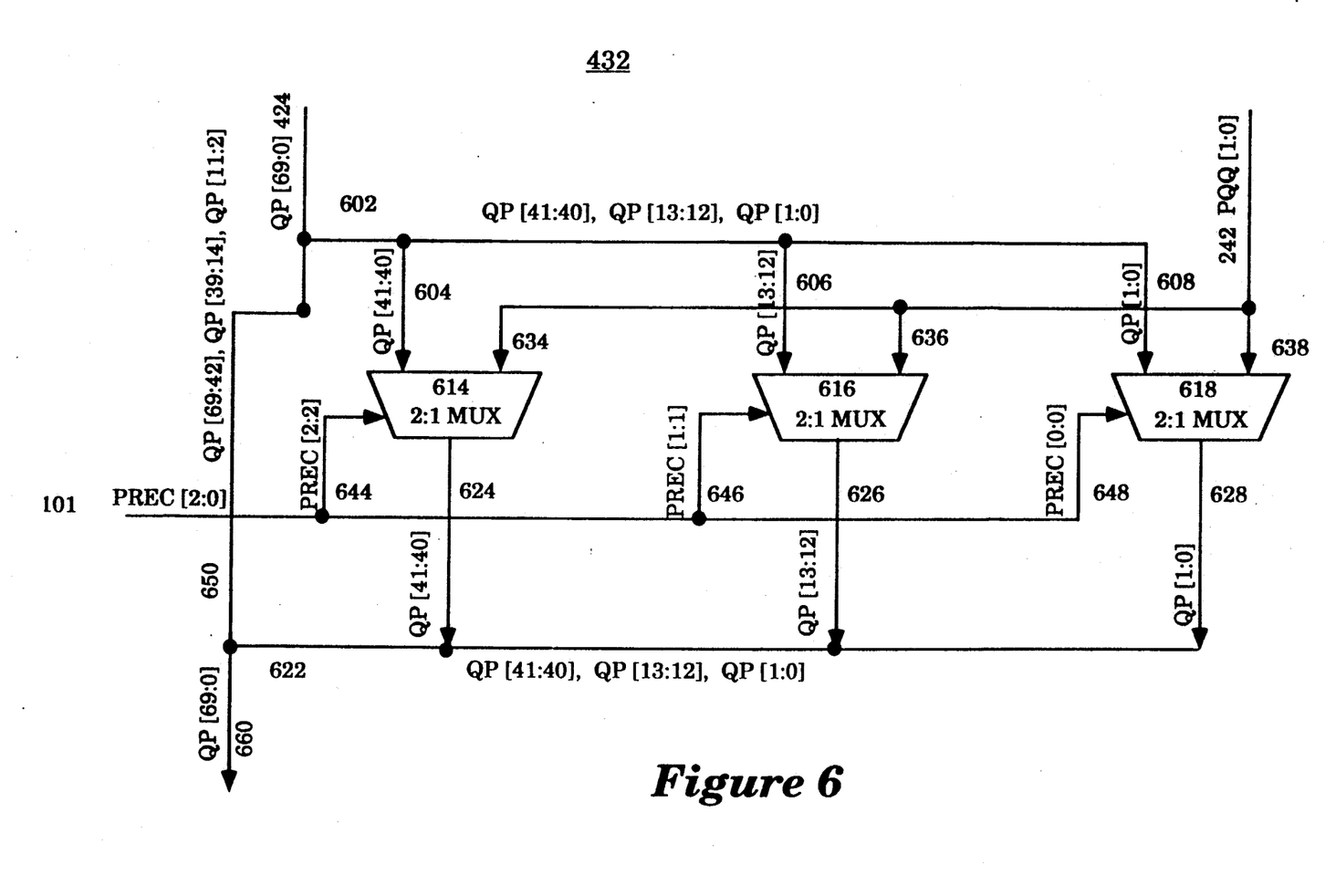
FIG. 6 is a schematic illustration of the steering logic which is used to steer the positive quotient prediction bits according to the precision selected.

FIG. 6 is a schematic illustration of positive quotient logic 432 which is used to steer the next positive quotient 242 prediction bits according to the precision indicated by precision select signal 101.

Next positive quotient 242 is a two bit signal PQQ[1:0]. It corresponds to the next two bits generated by the radix 4 SRT division algorithm quotient prediction logic 200 (FIG. 3).

During a division step, input 424 contains signal QP[69:0] which corresponds to the positive quotient from the previous step shifted left two bits with zeros added to the two right-most bits QP[1:0]. Similarly, output 660 contains signal QP[69:0] after the signal PQQ[1:0] has been shifted into the proper bits of signal QP[69:0] as indicated by PREC[2:0]. If PREC[2:2] is asserted, single precision is required for the division operation, and PQQ[1:0] is shifted into QP[41:40]. Similarly, if PREC[1:1] is asserted, double precision is required for the division operation, and PQQ[1:0] is shifted into QP[13:12]. Finally, if PREC[0:0] is asserted, extended precision is required for the division operation and PQQ[1:0] is shifted into QP[1:0]. This shifting function is accomplished by 2:1 multiplexers 634, 636 and 638, respectively. Again, note that if none of the PREC[2:0] signals are asserted, no shifting of PQQ[1:0] into QP[69:0] is performed, and QP[69:0] is not altered, thereby permitting the positive quotient logic 432 to be effectively idled.

The information contained in input 424 is split into multi-bit lines 602 and 650 with 602 containing QP[41:40], QP[13:12], QP[1:0] and 650 containing QP[69:42], QP[39:14], QP[11:2]. The information contained in line 602 is split into two-bit input lines 604, 606 and 608 with 604 containing QP[41:40], 606 containing QP[13:12] and 608 containing QP[1:0]. Input lines 604, 606 and 608 provide a first input to 2:1 multiplexers 614, 616 and 618, respectively. PQQ[0:1] provides the second input to multiplexers 614, 616 and 618.

Output lines 624, 626 and 628 contain the information for new QP[41:40], QP[13:12], QP[1:0] as determined by the values of PREC[2:0]. Lines 624, 626 and 628 merge to form line 622 which is then merged with line 650 to form line 660.

The present invention has application for use in math processing environments and may be incorporated into a variety of data processing systems. Although the present invention has been described in conjunction with the embodiments illustrated in FIGS. 1–6, it is evident that numerous alternatives, modifications, variations and uses will be apparent to those skilled in the art in light of the foregoing description.

What is claimed is:

1. In a divider circuit capable of dividing with a first or second precision, said first precision not equal to said second precision, said divider circuit comprising a quotient predictor circuit and a quotient generator circuit coupled to said quotient predictor circuit, said quotient predictor circuit providing N bit quotient component predictions to said quotient generator circuit, where N is a positive integer, said quotient generator circuit combining said N bit quotient component predictions iteratively to form a redundant running quotient data value, circuitry in said quotient generator circuit for significant bit positioning of said redundant running quotient comprising:

storage means for storing said redundant running quotient data value;

shifting means, coupled to said storage means, for receiving said redundant running quotient data value from said storage means and shifting said redundant running quotient data value N bit positions; and multiplexing means coupled between said storage means and said shifting means and to said quotient predictor circuit, said multiplexing means receiving said redundant running quotient data value from said shifting means and a N bit quotient component prediction of said N bit quotient component predictions from said quotient generator circuit, said multiplexing means selectively providing said N bit quotient component prediction to a first N bit location within said redundant running quotient data value if said divider is dividing with said first precision and providing said N bit quotient component prediction to a second N bit location within said redundant running quotient data value if said divider is dividing with said second precision.

2. The circuitry according to claim 1 wherein N has the value two.

3. The circuitry according to claim 1 wherein said shifting means inserts a N bit value into said N bit positions from which said redundant running quotient data value was shifted.

4. The circuitry according to claim 3 wherein said N bit value is zero.

5. The circuitry according to claim 1 wherein said shifting means shifts said redundant running quotient data value to a higher order by N bit positions.

6. The circuitry according to claim 1 wherein said divider performs a nonrestoring division operation.

7. The circuitry according to claim 6 wherein said divider performs a SRT nonrestoring division operation.

8. The circuitry according to claim 7 wherein said divider performs a radix M SRT nonrestoring division operation, where M is a positive integer.

9. The circuitry according to claim 8 wherein M has the value four.

10. The circuitry according to claim 1 wherein said shifting means is a multiplexer.

11. In a divider circuit capable of dividing with a first or second precision, said first precision not equal to said second precision, said divider circuit comprising a quotient predictor circuit and a quotient generator circuit coupled to said quotient predictor circuit, said quotient predictor circuit providing negative N bit quotient component predictions and positive N bit quotient component predictions to said quotient generator circuit, where N is a positive integer, said quotient generator circuit combining said negative N bit quotient component predictions iteratively to form a negative redundant running quotient data value and combining said positive N bit quotient component prediction iteratively to form a positive redundant running quotient data value, circuitry in said quotient generator circuit for significant bit positioning of said negative and positive redundant running quotients comprising:

first storage means for storing said negative redundant running quotient data value;

first shifting means, coupled to said first storage means, for receiving said negative redundant running quotient data value from said first storage means and shifting said negative redundant running quotient data value N bit positions;

first multiplexing means coupled between said first storage means and said first shifting means and to said quotient predictor circuit, said first multiplexing means receiving said negative redundant running quotient data value from said first shifting means and a N bit component prediction of said negative N bit quotient component predictions from said quotient predictor circuit, said first multiplexing means selectively providing said negative N bit quotient component prediction to a first N bit location within said negative redundant running quotient data value if said divider is dividing with said first precision and providing said negative N bit quotient component prediction to a second N bit location within said negative redundant running quotient data value if said divider is dividing with said second precision;

second storage means for storing said positive redundant running quotient data value;

second shifting means, coupled to said second storage means, for receiving said positive redundant running quotient data value from said second storage means and shifting said positive redundant running quotient data value N bit positions; and second multiplexing means coupled between said second storage means and said second shifting means and to said quotient predictor circuit, said second multiplexing means receiving said positive redundant running quotient data value from said second shifting means and a positive N bit quotient component prediction of said positive N bit quotient component predictions from said quotient predictor circuit, said second multiplexing means selectively providing said positive N bit quotient component prediction to a third N bit location within said positive redundant running quotient data value if said divider is dividing with said first precision and providing said positive N bit quotient component prediction to a fourth N bit location within said positive redundant running quotient data value if said divider is dividing with said second precision.

12. The circuitry according to claim 11 wherein N has the value two.

13. The circuitry according to claim 11 wherein said first shifting means insert a first N bit value into said N bit positions from which said negative redundant running quotient data value was shifted and said second shifting means insert a second N bit value into said N bit positions from which said positive redundant running quotient data value was shifted.

14. The circuitry according to claim 13 wherein said first and second N bit values are zero.

15. The circuitry according to claim 11 wherein said first shifting means shifts said negative redundant running quotient data value to a higher order by N bit portions and said second shifting means shifts said positive redundant running quotient data value to a higher order by N bit positions.

16. The circuitry according to claim 11 wherein said divider performs a nonrestoring division operation.

17. The circuitry according to claim 16 wherein said divider performs a SRT nonrestoring division operation.

18. The circuitry according to claim 17 wherein said divider performs a radix M SRT nonrestoring division operation, where M is a positive integer.

19. The circuitry according to claim 18 wherein M has the value four.

20. The circuitry according to claim 11 wherein said first and second shifting means are multiplexers.

21. In a divider circuit capable of dividing with a first or second precision, said first precision not equal to said second precision, said divider circuit comprising a quotient predictor circuit and a quotient generator circuit coupled to said quotient predictor circuit, said quotient predictor circuit providing N bit quotient component predictions to said quotient generator circuit, where N is a positive integer, said quotient generator circuit combining said N bit quotient component predictions iteratively to form a redundant running quotient data value, a method for significant bit positioning within said quotient generator circuitry of said redundant running quotient comprising the steps of:

(a) storing said redundant running quotient data value;

(b) receiving said redundant running quotient data value and shifting said redundant running quotient data value N bit positions; and (c) receiving said redundant running quotient data value from said shifting means and a N bit quotient component prediction of said N bit quotient component predictions from said quotient generator circuit and selectively providing said N bit quotient component prediction to a first N bit location within said redundant running quotient data value if said divider is dividing with said first precision and providing said N bit quotient component prediction to a second N bit location within said redundant running quotient data value if said divider is dividing with said second precision.

22. The method according to claim 21 wherein N has the value two.

23. The method according to claim 21 wherein step (b) further comprises the step of:

(b.1) inserting a N bit value into said N bit positions from which said redundant running quotient data value was shifted.

24. The method according to claim 23 wherein said N bit value is zero.

25. The method according to claim 21 wherein said redundant running quotient data value is shifted to a higher order by N bit positions.

26. The method according to claim 21 wherein said divider performs a nonrestoring division operation.

27. The method according to claim 26 wherein said divider performs a SRT nonrestoring division operation.

28. The method according to claim 27 wherein said divider performs a radix M SRT nonrestoring division operation, where M is a positive integer.

29. The method according to claim 28 wherein M has the value four.

* * * * *